United States Patent [19]
Narayan et al.

[11] Patent Number: 4,891,404
[45] Date of Patent: Jan. 2, 1990

[54] BIODEGRADABLE GRAFT COPOLYMERS

[75] Inventors: Ramani Narayan; George T. Tsao, both of West Lafayette, Ind.; Christopher J. Biermann, Corvallis, Oreg.

[73] Assignee: Purdue Research Foundation, West Lafayette, Ind.

[21] Appl. No.: 199,999

[22] Filed: May 27, 1988

[51] Int. Cl.$^4$ .................. C08F 251/00; C08F 251/02; C08G 83/00
[52] U.S. Cl. ................................ 525/54.2; 525/54.21; 525/54.24
[58] Field of Search .................. 525/54.2, 54.21, 54.24

[56] References Cited

U.S. PATENT DOCUMENTS

| | | | |
|---|---|---|---|
| 3,332,897 | 7/1967 | Ray-Chaudhuri | 527/312 |
| 3,485,777 | 12/1969 | Gaylord | 527/300 |
| 3,645,939 | 2/1972 | Gaylord | 527/300 |
| 3,921,333 | 11/1975 | Clendinning et al. | 47/37 |
| 3,956,230 | 5/1976 | Gaylord | 527/300 |
| 4,026,849 | 5/1977 | Bagley et al. | 527/300 |
| 4,071,494 | 1/1978 | Gaylord | 527/300 |
| 4,133,784 | 1/1979 | Otey et al. | 527/312 |
| 4,207,221 | 6/1980 | Tobias et al. | 521/142 |
| 4,337,181 | 6/1982 | Otey et al. | 527/312 |
| 4,454,268 | 6/1984 | Otey et al. | 527/312 |

OTHER PUBLICATIONS

"Degradable Polymers?", Parr, J., *Forbes,* Oct. 5, 1987, pp. 206–210.
"Industry Weighs Need To Make Polymer Degradable", Leaversuch, R., *Modern Plastics,* Aug. 1987, pp. 52–55.
"Starch-Based Blown Films", Otey et al., *Ind. Eng. Chem. Prod. Res. Dev.,* 1980, vol. 19, 592–595.
"Starch-Filled Polyvinyl Chloride Plastics—Preparation and Evaluation", Westhoff, et al., *Ind. Eng. Chem. Res. Develop.,* vol. 13, No. 2, 1974, pp. 123–125.
"Starch-Based Films, Preliminary Diffusion Evaluation", Otey et al., *Ind. Eng. Chem. Prod. Res. Dev.,* 1984, vol. 23, pp. 284–287.
"Starch-Based Film for Degradable Agricultural Mulch", Otey et al., *Ind. Eng. Chem. Prod. Res. Develop.,* vol. 13, No. 1, 1974, pp. 90–92.
"Biodegradable Films from Starch and Ethylene-Acrylic Acid Copolymer", *Ind. Eng. Chem. Prod. Res. Dev.,* vol. 16, No. 4, 1977, Otey et al., pp. 305–308.
"Graft Copolymers of Polysaccharides with Thermoplastic Polymers, a New Type of Filled Plastic", Bagley et al., *Polymer Engineering and Science,* May, 1977, vol. 17, No. 5, pp. 311–316.
"Heterogeneous Polymer Systems, II, Mechanisms of Stabilization of Polymeric Oil-in-Oil Emulsion", Molau *Journal of Polymer Science: Part A,* vol. 3, pp. 4235–4242 (1965).
"Interfacial Agents (Compatibilizers) for Polymer Blends", Paul, *Polymer Blends: Chapter 2,* Academic Press, 1978, pp. 35–62.
"Graft Copolymer Modification of Polyethylene-Polystyrene Blends, II, Properties of Modified Blends", Locke et al., *Journal of Applied Polymer Science,* vol. 17, 1973, pp. 2791–2800.
"Effect of Addition of Graft Copolymer on the Microstructure and Impact Strength of PS/LDPE Blends", Barentsen et al., *Polymer,* 1974, vol. 15, Feb., pp. 119–122.
"Mechanical Properties of Polystyrene/Low Density Polyethylene Blends", Barentsen et al., *Polymer,* 1973, vol. 14, Nov., pp 579–583.
"The Preparation and Characterization of Polyisobutylene-Grafted Cellulose Pulp", Coleman--

(List continued on next page.)

Primary Examiner—Morton Foelak
Assistant Examiner—Nathan M. Nutter
Attorney, Agent, or Firm—Barnes & Thornburg

[57] ABSTRACT

A nucleophilic displacement reaction is used to prepare biodegradable thermoplastic copolymers exhibiting a high capacity for stabilizing biodegradable blends of polysaccharides and synthetic thermoplastic polymers. The graft copolymers are characterized by consistent product uniformity and a high degree of substitution on the polysaccharide chain.

22 Claims, 3 Drawing Sheets

OTHER PUBLICATIONS

Kammula and Huskers, *Wood and Cellulosics: Chapter 2*, John Wiley & Sons, pp. 195–202.

Mansson, P.; Westfelt, L., *J. Poly. Sci., Polym. Chem. Ed.*, 1981, vol. 19, p 1509.

Mannson, P., J. Poly. Sci., Polym. Chem. Ed., vol. 18, 1945–1956 (1980).

"New Route to Biodegradable Plastics", *Chemical and Engineering News*, Aug. 17, 1987, p. 26.

"Engineer Biodegradable Plastics with Graft Co-Polymer Technique", [sic], Inside R&D, Sep. 23, 1987, vol. 16, No. 38.

"Synthesis of Cellulose-g-Polystyrene by Anionic Polymerization", Narayan and Shay, published 1987, Elsevier Science Publishing Company, Inc., pp. 441–450.

"Grafting of Polystyrene onto Cellulose Acetate by Nucleophilic Displacement of Mesylate Groups Using the Polystyrylcarboxylate Anion", Biermann eta l., *Macromolecules*, 1987, vol. 20, No. 5, pp. 954–957.

"Grafting of Preformed Polyamide Onto Cellulose Acetate", Biermann and Narayan, Forest Products Journal, Jan. 1988, pp. 1–16.

"Preparation of Corn-Based Plastics for Materials Applications", Narayan, presented at First Annular Corn Utilization Conference (St. Louis, Mo.), Jun. 1987; bound 1988.

"Grafting of Partially Hydrolysed Poly(methyl methacrylate) Onto Mesylated Cellulose Acetate", Biermann and Narayan, *Polymer*, vol. 28, Dec. 1987, pp. 2176–2178.

STEP - 1

Cell = Cellulose
Ac = -COCH₃
Ts = —SO₂-Ar-CH₃

STEP - 2

STEP - 3

Cellulose - g - PS

BIODEGRADABLE GRAFT COPOLYMERS

BACKGROUND AND SUMMARY OF THE INVENTION

This invention relates to the preparation of biodegradable thermoplastic graft copolymers. More particularly, this invention relates to an improved process for converting a polysaccharide to a biodegradable thermoplastic graft copolymer not only capable of forming homogeneous blends with synthetic thermoplastic polymers itself, but further capable of functioning as compatibilizing/stabilizing agents for blends of cellulose and starch with synthetic plastics. Nucleophilically displaceable groups are formed on the polysaccharide and are thereafter displaced by selected polymers having anionic carboxylate or thiocarboxylate groups, to provide high yields of well-defined, multifunctional biodegradable thermoplastic graft copolymers.

Increasingly strident environmental concerns have put pressure on federal and state legislatures to mandate plastics degradability. This is a push that directly affects an annual 1.8 billion pounds of business, mostly packaging, done by the plastics industry. Plastics take as much as 200 years to degrade in landfill. Plastic litter dumped into the oceans every day cause heavy loss of marine and animal life. Naturally occurring biopolymers like starch and cellulose are readily biodegradable (degrades only in soil, sewage and marine environments where bacteria are active—that is, biologically active environments only—precisely the conditions where onset of degradation is desired). Incorporation of these types of biopolymers plastics (styrenic plastics or polyethylene or polymethyl methacrylate plastics) by blending or graft copolymerization should lead to a new type of plastics having the trait of biodegradability. However, preparing a new material system by mixing two incompatible polymers as in the present case results in products with reduced physical properties. Strength and toughness values are minimal and are lower for the mixture than any of the pure components. This situation arises from poor interfacial adhesion between the individual components due to their inherent incompatibility. It is like trying to mix or disperse oil and water. The solution to this incompatibility problem which is widely practiced in the polymer industry, uses block or graft copolymers of the form A-B as compatibilizers or interfacial agents to improve adhesion between immiscible A rich and B-rich phases. To function effectively as a compatibilizer, the following is true: (1) components of the graft copolymers must be identical with the polymers in the two phases (identical with the 2 dissimilar polymers which needs to be blended); (2) molecular weight of the segments plays an important role, and control over the molecular weights is essential; (3) molecular weights greater than 150,000 is generally a poor compatibilizer; (4) block or graft copolymers segments containing 10-15 monomer units is an effective compatibilizing agent for the corresponding higher molecular weight homopolymer.

Thus, the key to the incorporation of natural biopolymers like starch and cellulose in a plastics materials system to make biodegradable/bio based plastics is the ability to tailor cellulose/starch synthetic polymer graft copolymer structures with control over the molecular weights of the graft, degree (amount) of graft substitution and control over backbone graft linkage. Current technology does not permit the making of cellulose/starch (natural biopolymers)—synthetic polymer graft copolymers with precise control over molecular weights, degree of substitution, backbone graft linkage, etc., i.e., cannot make precise tailor made cellulose/starch graft copolymers.

The present invention allows the preparation of tailor-made cellulose/starch synthetic polymer graft copolymers with good control over molecular weights degree of substitution, backbone-graft linkage. These graft copolymers can function effectively as compatibilizing agents/interfacial agents for compounding/blending of cellulose and starch with synthetic polymers. The graft copolymer allows a fine dispersion of the natural polymer into the plastic phase without detracting from the excellent mechanical and thermal properties inherent in the plastic, while incorporating a new trait of biodegradability.

The grafting of synthetic polymers onto polysaccharides and polysaccharide derivatives has been described in the art. Preparation of cellulosic graft polymers utilizing free radical polyerization methods has been reported by McDowall, Gupta, and Stannett, *Prog. Polym. Sci.* 1984, 10, 1; Hebeish and Guthrie, *The Chemistry and Technology of Cellulosic Copolymers*, Berlin, 1981; Arthur, *Adv. Macromol. Chem.* 1970, 2, 1 See also U.S. Pat. No. 4,026,849. Polyisobutylene-grafted cellulose products have been prepared by reacting anhydride-terminated polyisobutylene with sodium cellulosate. Coleman-Kammula and Hulskers *Wood and Cellulosics—Industrial Utilisation, Biotechnology, Structure and Properties* 1987, 195-202. The successful grafting of the polyisobutylene onto cellulose involves the conversion or activation of cellulose to cellulosates. Polystyrene has been grafted onto cellulose acetate with a grafting yield of up to 83% using the acid chloride of carboxylic acid-terminated polystyrene. Mansson and Westfelt, *J. Polym. Sci., Polym. Chem. Ed.* 1981, 19, 1509. This method involves the acylation of the free hydroxyl groups on the cellulose acetate by the polystyrene acid chloride. Other known methods for preparing graft copolymers include the simultaneous polymerization and grafting of an ethylenically unsaturated monomer onto the molecule of a polysaccharide and thereafter reacting the grafted polysaccharide, in the presence of a catalyst, with an acylating agent to form a polysaccharide ester derivative. See U.S. Pat. No. 3,332,897.

The known methods for synthesizing polysaccharide-synthetic polymer graft copolymers have several disadvantages. For example, the molecular weights of graft copolymers produced by free radical polymerization techniques are very high and the molecular weight distribution in such copolymers is polydisperse. The reproducibility of these polymerization methods is also poor and there is little control over the grafting process. Thus, the resultant graft copolymers exhibit a low level of graft substitution typically with very high molecular weight graft molecules. Likewise, products prepared by other prior art polymerization reactions have considerable disadvantages. For example, products prepared by reacting a polysaccharide and an acid anhydride cannot be molded easily, if at all. Typically, such molded products are brittle, inflexible and entirely unsuitable for commercial utilization. Moreover, to achieve high grafting efficiencies, strictly anhydrous conditions must be used along with fairly large amounts of acylation catalysts such as 4-(dimethylamino) pyridine with reaction periods of up to 3 days. Thus, there is the need in the art for an improved method of synthesizing biodegradable polysaccharide graft copolymers.

It is an object of this invention to provide an improved method of preparing polysaccharide-synthetic polymer graft copolymers.

A further object of this invention is to provide an economic, commercially feasible procedure for achieving high yields of well-defined biodegradable graft copolymers.

An additional object of this invention is to provide a grafting method which allows greater control of the molecular weight distribution and the number and nature of the grafted sidechains.

Still another object of this invention is the use of such novel biodegradable thermoplastic copolymers alone and for blending with synthetic thermoplastic polymers, with or without other added biodegradable polysaccharides, to provide homogeneous, tough, high strength biodegradable plastics.

SUMMARY OF THE INVENTION

Figure 1:
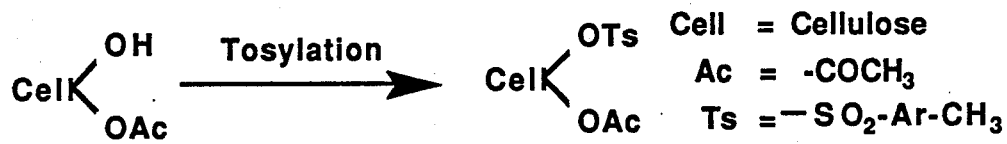
FIG. 1 illustrates use of carbonionic nucleophilic graft copolymerization.
Figure 1:
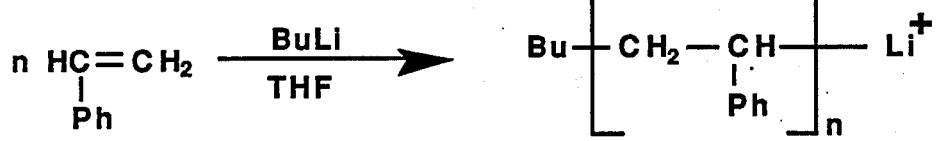
Figure 1:
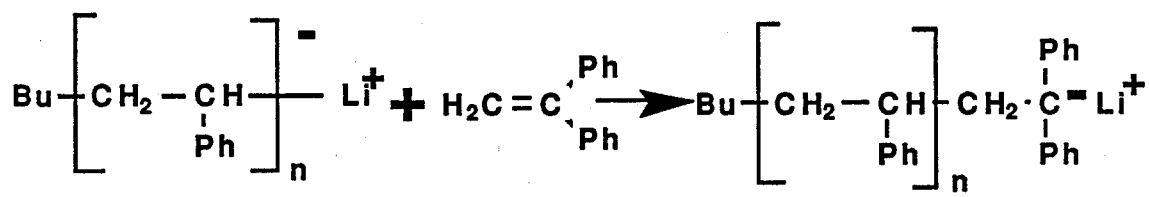
Figure 1:
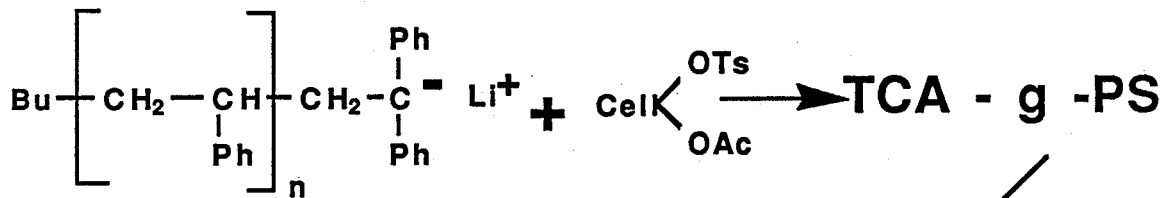
Figure 1:
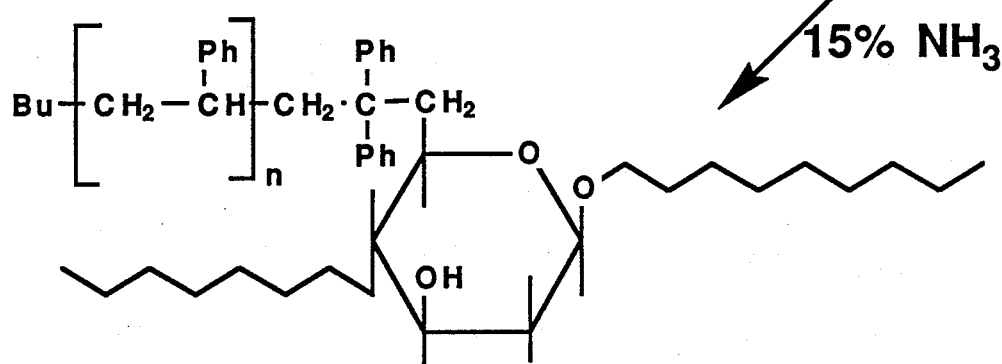

In accordance with the present invention, a method is provided for converting a polysaccharide to a biodegradable thermoplastic graft copolymer which is not only capable itself of forming uniform blends with synthetic thermoplastic polymers but is also surprisingly effective for compatibilizing blends of synthetic thermoplastic polymers and biodegradable polysaccharides.

The method comprises the steps of chemically treating said polysaccharide to form on said polysaccharide nucleophilically displaceable groups at a substitution level of about 0.1 to about 0.75 nucleophilically displaceable groups per anhydroglucose unit of said polysaccharide; reacting said polysaccharide bearing nucleophilic displaceable groups with an anionic thermoplastic polymer carboxylate or thiocarboxylate under conditions conducive to nucleophilic displacement of said groups by said anionic carboxylate or thiocarboxylate; and isolating the resulting biodegradable thermoplastic graft copolymer.

Suitable polysaccharides include starch, chitin, lignin, cellulose and derivatives thereof. Starch and cellulose and their commercially available ethers and esters are preferred. Cellulose acetate has been found to be particularly well suited as a starting material for use in the present method.

The anionic polymer carboxylate or thiocarboxylate can be derived, for example, by acid or base hydrolysis of corresponding polymer esters. A preferred anionic polymer of the formula

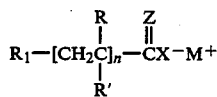

wherein $R_1$ is $C_1$–$C_6$ alkyl or a group of the formula

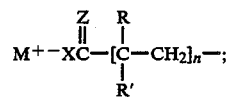

can be prepared by (1) anionic polymerization of a compound of the formula R—CR′═CH$_2$ and (2) treatment with a compound of the formula X═C═Z, wherein in the above formulas R and R′ are independently hydrogen, $C_1$–$C_6$ alkyl, phenyl, substituted phenyl or methoxycarbonyl; X and Z are each independently O or S; M$^+$ is an alkali metal cation; and n is an integer such that the group

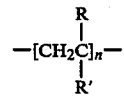

has a molecular weight between about 3000 and about 25,000, more preferably between about 5000 and 18,000; reacting said anionic thermoplastic polymer with said polysaccharide bearing nucleophilically displaceable groups under conditions conducive to nucleophilic displacement of said groups by said anionic polymer; and isolating the resulting biodegradable thermoplastic graft copolymer. The molecular weight of such anionic polymers can be controlled by the nature of the base used to catalyze the anionic polymerization reaction and the molar ratio of base to the polymerizable monomer (RCR′═CH$_2$) For example, the molecular weight of polystyrylcarboxylate obtained by the n butyl lithium initiated polymerization of polystyrene can be estimated by the formula:

$$\frac{\text{grams of styrene}}{\text{moles of base (n-butyllithium)}} \approx \frac{\text{molecular weight of}}{\text{polystyrene}}$$

Suitable nucleophilic displaceable groups are halo, sulfate, haloacetoxy, lower alkane (methyl, ethyl, propyl, butyl)sulfonyloxy, benzylsulfonyloxy and aryl (e.g., phenyl and substituted phenyl)sulfonyloxy, e.g., benzenesulfonyloxy, p toluenesulfonyloxy and the like. Skilled practitioners will readily appreciate what conditions/reagents are appropriate to introduce such displaceable groups on the polysaccharide chain.

Preferred DS (degree of substitution) for the polysaccharide copolymer is somewhat dependent on the DP (degree of polymerization) of the anionic polymer. Where the anionic polymer has a DP such that its average molecular weight is in a preferred range of 5000 to 18,000, the DS of the graft copolymers preferably should be in the range of 1 polymer substituted to every 15 to 100 glucose units, more preferably 1 substituent to every 15 to 50 glucose units, in the copolymerized polysaccharide chain.

The present method avoids the problems encountered with prior art preparations of polysaccharide based plastics. The method employed in this invention has been found to provide unprecedented control over the grafting mechanism. Because the reaction chemistry involves an SN$_2$ type nucleophilic displacement reaction by the synthetic polymer, there is no uncertainty in the nature of the backbone-graft linkage. Homopolymer formation is minimized and, if formed, is easily extractable. The resultant graft polymer composition, including structure, molecular weight, molecular weight distribution, and sequence distribution are well defined and readily reproducible. The degree of substitution (DS) of the graft copolymer is controlled by controlling the ratio between the reactive sites on the polysaccharide backbone and the synthetic carboxylate polymer.

The present invention is based on the discovery that by modifying carbonations to form a more controllable, less reactive group, better control of the grafting process can be obtained with negligible side reactions. Carboxylate-terminated or thiocarboxylate synthetic polymers are sufficiently nucleophilic to displace better leaving groups such as halo, haloacetoxy, lower-alkane methane sulfonyloxy, or arylsulfonyloxy, with the concomitanant formation of an ester linkage between the synthetic polymer and the polysaccharide. A further advantage of the direct use of the carboxylate-terminated polymer is that water does not interfere with the grafting reaction.

Polymers produced by art-recognized anionic polymerization techniques are favored intermediates for carboxylate terminated polymers since the later can be derived simply by addition of carbon dioxide (or the sulfur analogues thereof: COS and $CS_2$) immediately following the anionic polymerization reaction is complete.

FIG. 1 depicts a three-step procedure for the preparation of cellulose graft polystyrene by reaction with a polystyryl carbanion. Cellulose acetate is first tosylated for example, by reaction with tosyl chloride in the presence of a proton acceptor. Styrene is polymerized utilizing n-butyllithium in THF, typically at dry ice/acetone temperature. Step 2 also includes capping the anionic form of the resulting polystyrene with 1,1-diphenylethylene to stabilize the anionic polymer prior to its use in the Step 3 reaction with cellulose tosylate. The reaction carbanions with polysaccharides having displaceable groups have been found much more difficult to control than those with the carboxylate derivatives.

Figure 2:
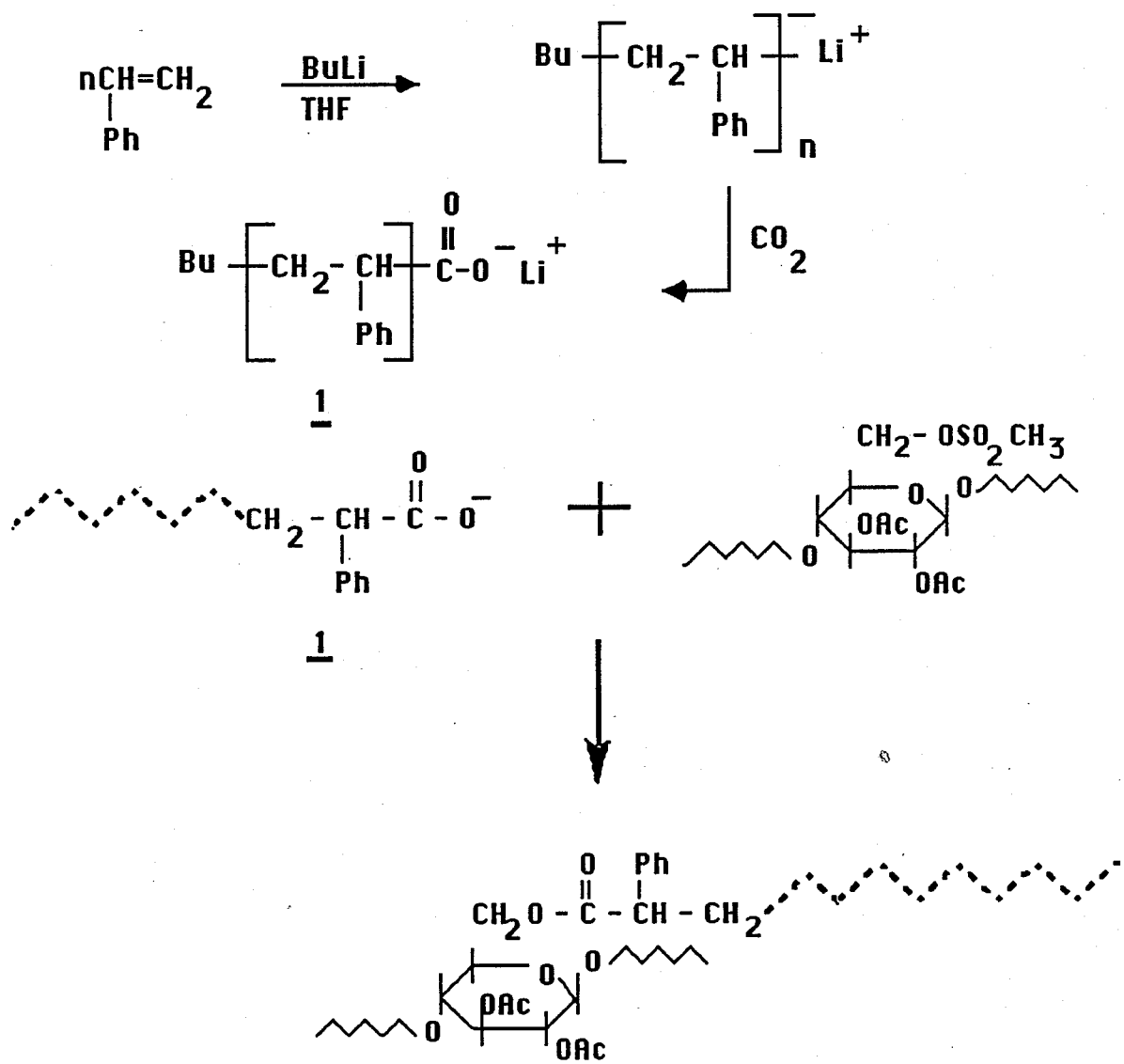
FIGS. 2-3 illustrate reaction schemes for preparation of biodegradable graft copolymers via carboxylates in accordance with the invention.
Figure 3:
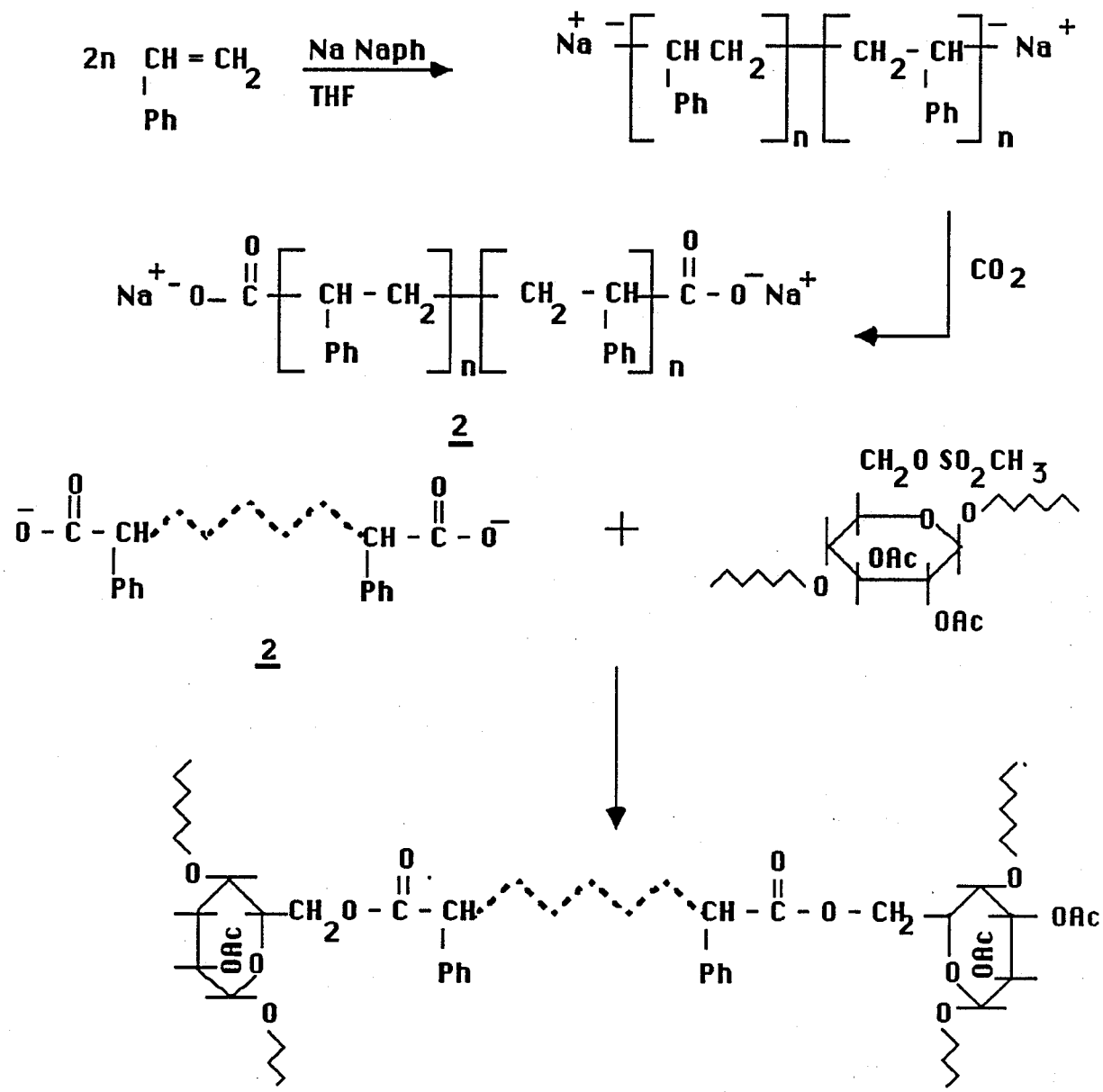

FIG. 2 illustrates the grafting of polystyrylcarboxylate anion 1 onto mesylated cellulose acetate. FIG. 3 illustrates the formation of the polystyryldicarboxylate anion 2 by carbon dioxide quenched, sodium napthalene induced, anionic polymerization of styrene, and the use of that dicarboxylate intermediate to form, upon reaction with mesylated cellulose acetate, a controlled crosslinked graft copolymer.

The graft copolymers in accordance with this invention are useful for the construction of articles of manufacture, for example, food packaging articles, which not only have the favorable structural characteristics of synthetic plastics but also are biodegradable. The graft copolymers can be blended with art-recognized thermoplastic resins, such as polyethylene, polypropylene, polystyrene, polymethylmethacrylate or polyacrylonitrile in a ratio of about 1:8 to about 5:2, respectively, to provide structurally functional yet biodegradable plastic blends. Increased graft copolymer content corresponds to faster rates of biodegradation.

The present graft copolymers are perhaps most advantageously employed as agents to compatibilize synthetic thermoplastic polymers and biodegradable polysaccharide fillers or additives. Thus biodegradable blends having functional characteristics very similar to that of the unfilled synthetic thermoplastic polymer can be prepared by blending the synthetic thermoplastic polymer with about 5 to about 40 weight percent (based on wt. of blend) of polysaccharide, for example, granular starch or cellulose acetate, and about 5 to about 30 weight percent of a graft copolymer (preferably of a polysaccharide of a structure closely related to that of the polysaccharide added to the blend). The blend can then be subject to extrusion processing or it can be utilized in other art recognized manufacturing procedures to form biodegradable articles of manufacture.

Detailed Description of the Invention

EXAMPLE 1

Grafting of Polystyrene onto Cellulose Acetate

Polystyrylmono- and -dicarboxylate anions were prepared in tetrahydrofuran by using n-butyllithium and sodium naphthalene as the initiators, respectively, at $-78°$ C. The carbanions were reacted with dry carbon dioxide. The products were precipitated in methanol, filtered, washed with water and methanol, and dried. GPC analysis established molecular weight values of 6200 for the polystyrylmonocarboxylate and 10,900 for the polystyryldicarboxylate products.

Cellulose acetate (Eastman Kodak, 40% acetyl, DS 2.5) (10g) was mesylated by the procedure of Wolfrom et al. (Wolfrom, M. L., Sowden, J. C., and Metcalf, E. A., *J. Am. Chem. Soc.* 1941, 63, 1688) with 6 ml of methanesulfonyl (mesyl) chloride in 200 ml of pyridine for four days at room temperature. Elemental analysis gave 45.61% C, 5.52% H, and 4.90% S corresponding to mesyl substitution of 0.46 mesyl groups per anhydroglucose unit. Cellulose acetate with a lower mesyl contact was prepared by reacting 50 g of cellulose acetate in 500 ml of pyridine and 3.50 ml of mesyl chloride for one day at room temperature. Elemental analysis gave 46.70% C, 5.68% H, and 2.42% S, corresponding to a DS of 0.21 for the mesyl groups.

The grafting reaction was carried out by adding 0.50 g of mesylated cellulose acetate and 1.00 g of polystyrylcarboxylate to a 25-ml Erlenmeyer flask with 20 ml of solvent (4:1 dimethylformamide, dimethylsulfoxide:THF, or, in a few reactions, other solvents). When dimethylsulfoxide was used as the solvent, some THF was added in order to dissolve the polystyrene.

Initial grafting reactions with the mesylated cellulose acetate and lithium polystyrylcarboxylate were carried out at room temperature for three days in acetone and methylene chloride. Analysis of these samples showed that about 5–15% grafting yields were realized. Modifying the reaction conditions to 50° C. in dimethylsulfoxide/THF for three days gave grafting yields of 45%. Optimum conditions with a temperature of 75° C. for a reaction time of 20 h were used in the remaining grafting reactions.

Allowing the reaction to proceed for 72 h in dimethylsulfoxide at 75° C. did not significantly change the yield. This evidence indicates that the grafting reaction is essentially complete after 20 h at 75° C. and that the grafting yield is limited only by the efficiency of the carboxylation reaction of polystyrene. The graft yields obtained in the reactions the polystyrylmonocarboxylate anions under the optimum conditions were close to the expected efficiency of carboxylation of 78–90%.

The graft polymers were precipitated with 200 ml of 4:1 methanol:water, filtered, washed with water and methanol, and dried. The product was then extracted with 100 ml of toluene with gentle shaking for 24 h to remove any unreacted polystyrene and polystyrylcarboxylte salt. The product was filtered, washed with toluene, dried, and weighed. The toluene extract and washings were combined and the amount of unreacted homopolymer present in each of the toluene extracts was determined after evaporation of the toluene.

The results of the grafting reactions are shown in Table 1. The grafting yield was calculated as the weight percent of the polystyrene (PS) that attaches to the cellulose backbone according to the following equation:

$$\frac{(\text{wt PS used}) - (\text{wt PS recovered in toluene})}{(\text{wt PS used})} \times 100\%$$

UV measurements in $CH_2Cl_2$ at 260 nm of the THF-soluble graft polymers were used to determine the polystyrene contents of the graft polymers. (Polystyrene homopolymer and mesylated cellulose acetate dissolved in $CH_2Cl_2$ were used to make a standard curve.)

The reaction of the mesylated cellulose acetate with the polystyrylmonocarboxylate anion resulted in graft polymer product soluble in THF. However, reaction with the polystyryldicarboxylate anion resulted in the formation of a solid gel, indicative of cross linking. Cross-linking was expected because both ends of the polystyrene chain could potentially react with the mesylate groups on the cellulose backbone.

The increase in weight of the toluene-extract product obtained, compared to the original weight of mesylated cellulose acetate, showed that grafting occurred. The fact that the toluene-extracted polystyrene decreased dramatically with increasing reaction temperature also indicated that a grafting reaction was occurring. Analysis of the products obtained from the reaction of the mesylated cellulose acetate with a polystyrylmonocarboxylate anion by GPC gave peaks corresponding to a molecular weight higher than the mesylated cellulose acetate, with no peaks in the range of the molecular weight of the homopolymer.

the case of the reactions performed in DMF, little nitrogen was incorporated.

The IR spectra was also in conformity with the grafting of polystyrene onto the cellulose backbone by displacement of the mesylated groups. Characteristic peaks of polystyrene were present such as the aromatic CH vibration (above 3000 $cm^{-1}$) and the aromatic ring vibrations (1500-1600 $cm^{-1}$), as well as the strong carbonyl band (1740 $cm^{-1}$) of the cellulose acetate. Because toluene extraction removed over 98% of the polystyrene homopolymer from the cellulose acetate-polystyrene lens, the presence of the polystyrene bands in the IR Spectra of the toluene-extracted graft polymers confirms the formation of a covalent link between polystyrene and the cellulose backbone.

The off-resonance proton-decoupled C NMR spectrum at 50° C. in dimethylformamide of the toluene-extracted graft polymer clearly showed signals corresponding to both cellulose and polystyrene components. Because this graft polymer product was extensively extracted with toluene to remove any polystyrene homopolymer, the presence of well-resolved intense polystyrene peaks in the NMR spectrum supported the covalent attachment of polystyrene to the cellulose backbone. Polystyrene peaks were readily discernible at: (1) 146 ppm with a multiple splitting pattern due to quaternary aromatic ring carbon; (2) 125 ppm corresponding to the other aromatic ring carbons; (3) the typical methylene ($CH_2$) resonance splittings centered around 48 ppm; and (4) single methane (CH) resonance at 41 ppm. The chemical shifts and the splitting patterns observed are in complete agreement with those reported for polystyrene. The signals due to the cellulose were: (1) the 107 ppm peak corresponding to the C-1 carbon of the anhydroglucose unit; (2) a group of signals between 70 and 80 ppm due to the C-2, C-3, C-4, and C-5 carbons; (3) the C-6 carbon signal at 63 ppm; and (4) the carbonyl carbon signal of the acetate

TABLE 1

| Copolymer Product | Product No. | Solvent | Grafting Yield, % | PS Content wt % | PS Content By UV, wt % | AGU per PS Chain |
|---|---|---|---|---|---|---|
| Polystyrylcarboxylate/cellulose acetate graft copolymer | 1 | DMF | 68 | 57.6 | 58.2 | 17.0 |
| Polystyrylcarboxylate/cellulose acetate graft copolymer | 2 | $Me_2SO$/THF | 60 | 54.5 | 59.9 | 19.3 |
| Polystyryldicarboxylate/cellulose acetate graft copolymer | 3 | DMF | 90.5 | 64.4 | | 22.5 |
| Polystyryldicarboxylate/cellulose acetate graft copolymer | 4 | $Me_2SO$/THF | 88.5 | 63.9 | | 23.0 |

Results of Grafting Experiments at 75° C. and 20 h

Some of the products were further subjected to mild alkaline hydrolysis. Pulverized product (200 mg) was added to 50 ml of 15% aqueous ammonia at room temperature for three days with mixing. The residue was extracted with THF to remove released polystyrene, mesylate, and acetate.

Elemental analysis of the reaction products in the mesylated cellulose acetate (mesyl-DS 0.46) is shown in Table 2. There was a marked increase in the carbon and hydrogen percentages with a corresponding decrease in the oxygen and sulfur percentages of the reaction product as compared to the starting mesylated cellulose acetate. Thus, elemental analysis data is also in conformity with the grafting of polystyrene onto the cellulose backbone by displacement of the mesylate groups. In groups on the cellulose at 170 ppm with the methyl of the acetate group appearing at 20 ppm. Each of the polystyrene peaks was much more intense than the ring C-1 to C-6 carbons of the anhydroglucose units because for every one anhydroglucose carbon there are 3.5 styrenic carbons.

The number of anhydroglucose units (AGU) per grafted polystyrene chain (Table 1) was calculated based on the molecular weight of polystyrene and the polystyrene content of the graft. A high degree of substitution corresponding to one polystyryl chain per 17-23 anhydroglucose units was obtained. One polystyrene chain per 17 anhydroglucose units in product 1 corresponds to about 16 polystyrene chains per cellulose acetate molecule based on the molecular weight of 7500 for the cellulose acetate. Because the reaction is slow and proceeds by second-order nucleophilic displacement, the grafting of polystyrene chains is limited to the primary carbon atoms. Because there were more free primary hydroxyl groups in cellulose acetate than in methyl cellulose (DS=1.7), upon mesylation, there were more mesyl groups on primary carbon atoms in cellulose acetate than in methyl cellulose. Thus, reaction of the polystyrylcarboxylate ion with mesylmethylcellulose proceeded much slower and gave lower graft yield (20%) than reaction with mesylcellulose acetate.

The presence of some water in the reaction medium did not have any deleterious effects on the coupling reaction. The only possible effect of the polystyrylcarboxylate anion, in suitable solvents, was to displace the mesylate group. Another important consideration is that complete mesylation is not required. Two trials with mesylcellulose acetate of lower mesyl content (mesyl DS 0.21) in DMF at 75° C. gave a grafting yield of 40% after 20 h and 65% after 96 h.

TABLE 2

Results of Grafting Experiments at 75° C. and 20 h

| Polymer Product | Product No. | C | H | S | N | O |
|---|---|---|---|---|---|---|
| Mesylated cellulose acetate (mesyl DS 0.46) | | 45.61 | 5.52 | 4.90 | | 43.97 |
| Polystyrylcarboxylate/ cellulose acetate graft copolymer | 1 | 70.07 | 6.90 | 2.83 | 0.37 | 19.83 |
| Polystyrylcarboxylate/ cellulose acetate graft copolymer | 2 | 68.62 | 6.90 | 2.52 | | 22.16 |
| Polystyryldicarboxylate/ cellulose acetate graft copolymer | 3 | 73.37 | 6.84 | 2.52 | 0.16 | 17.11 |
| Polystyryldicarboxylate/ cellulose acetate graft copolymer | 4 | 71.64 | 8.85 | 1.68 | | 17.83 |
| Polystyrylcarboxylate/ cellulose acetate (hydrolyzed) | 1 | 65.98 | 6.76 | 2.11 | | 25.15 |
| Polystyryldicarboxylate/ cellulose acetate (hydrolyzed) | 2 | 71.10 | 6.71 | 1.57 | | 20.62 |

EXAMPLE 2

Grafting of Partially Hydrolysed Poly(methyl methacrylate) onto Mesylated Cellulose Acetate Poly(methyl methacrylate) (PMMA) (20 g) (molecular weight 12000) was added to 0.5M or 0.2M KOH in ethanol (125 ml) and dissolved upon warming to refluxing temperature. Refluxing was continued for 24 h. Under these conditions, the 0.5M KOH solution gives about 8% hydrolysis of the methyl ester, while the 0.2M KOH gives about 3% hydrolysis corresponding to an average of 9.6 and 3.6 carboxylate groups per chain, respectively. The hydrolysed polymer was isolated by decanting the KOH/ethanol solution at room temperature. The polymer was then recrystallized in ethanol (200 ml) with about 80% recovery being achieved in both cases.

Cellulose acetate having a degree of substitution (DS) of 2.5 was mesylated as described previously in Example 1 to give one product having a mesyl DS of 0.46 and a second product of DS 0.21. O-methyl cellulose (DS 1.7) was also permesylated.

Each grafting reaction was carried out using mesylated cellulose acetate or O-methyl cellulose (1.00 g) and hydrolysed PMMA (1.00 g) dissolved in N,N-dimethyl formamide (DMF) (20 ml). The solutions were heated at 75° C. for 20 h. The time required for gelation (due to cross linking) is noted in Table 3.

The resultant graft copolymers were precipitated in methanol, washed, dried, and weighed. The products were then extracted with refluxing ethanol to remove ungrafted PMMA homopolymer. Grafting yields were calculated as the wt % of the PMMA attaching to the cellulose backbone according to the following formula:

$$\frac{(\text{Mass } PMMA \text{ used} - \text{Mass } PMMA \text{ recovered in toluene})}{\text{Mass } PMMA \text{ used}} \times 100\%$$

No grafting was observed if the unhydrolysed PMMA was used.

PMMA was partially hydrolysed with 0.2M KOH to form a carboxylate anion having an average of 3.6 carboxylate groups. A second partially hydrolysed product was prepared by hydrolysing PMMA with 0.5M KOH to form a carboxylate anion having 0.6 carboxylate groups. Each of these partially hydrolysed products were grafted onto mesylated cellulose acetate and O-methyl cellulose by a nucleophilic displacement ($SN_2$) reaction. Grafting yields were calculated as the wt % of PMMA covalently linked to the cellulose backbone, determined after ethanol (refluxing) extraction to remove PMMA homopolymer present in the reaction product. Quantitative yields of the graft copolymer were obtained at 75° C. in a very short reaction period (35-45 min).

The results of the grafting reactions are shown in Table 3. PMMA product 1 is unhydrolysed PMMA homopolymer. Product 2 is 0.2M KOH hydrolysed PMMA homopolymer and product 3 is 0.5M KOH hydrolysed PMMA homopolymer. MCA denotes mesylated cellulose acetate. MMC denotes mesylated O-methyl cellulose.

Because there are several active sites on the PMMA polymer as well as on the mesylated cellulose acetate, the products form gels. The carboxylate groups of PMMA are on tertiary carbon atoms, making them "hindered" acids. The nucleophilic displacement occurred relatively quickly, however, as monitored by the gelation times. Others have also shown that "hindered" carboxylate nucleophiles react about as quickly as "unhindered" carboxylate nucleophiles. Liotta, Harris, McDermott, Gonzalez, and Smith, *Tetrahedron Lett.* 1974, 28, 2417; Dursh, *Tetrahedron Lett.* 1974, 28, 2421; Akabori and Ohtomi, *Bull. Chem. Soc. Jpn.* 1975, 48, 2991.

The gelation times for PMMA/mesylated cellulose derivatives graft copolymers were much shorter than for the sodium salt of dicarboxy-terminated polystyrene. This may have been due to the presence of more active sites per chain, and also due to the use of large cations such as potassium as the counter ion of the carboxylate anion.

The IR spectrum of the graft copolymer product showed all of the unique peaks attributable to the PMMA and mesylated cellulose acetate. In addition, strong carbonyl stretching vibrations in the 1720-1750 $cm^{-1}$ region and enhanced —CH stretching vibrations just below 3000 $cm^{-1}$ were evident. This established that the ethanol-extracted reaction products had PMM grafted onto the cellulose backbones.

TABLE 3

| Substrate | PMMA[a] Product | Gelation Time (min) | Yields (%) Crude | Graft |
|---|---|---|---|---|
| MCA[b] (DS 0.46) | 3 | 20 | 100 | 100 |
| MCA (DS 0.46) | 3 | 23 | 101 | 99 |
| MCA (DS 0.21) | 3 | 36 | 88 | 98 |
| MCA (DS 0.21) | 3 | 35 | 90 | 99 |
| MCA (DS 0.46) | 2 | 42 | 100 | 98 |
| MCA (DS 0.46) | 2 | 44 | 98 | 98 |
| MCA (DS 0.21) | 2 | — | 88 | 86 |
| MCA (DS 0.21) | 2 | — | 85 | 84 |
| MMC[c] | 3 | 29 | 95 | 99 |
| MMC | 3 | 36 | 99 | 99 |

EXAMPLE 3

Grafting of Preformed Polyamide onto Cellulose Acetate

Mesylation of 10g of cellulose acetate (Eastman Kodak, 40% acetyl, DS 2.5, MW 60000) was carried out by the procedure set forth in Example 1. Elemental analysis gave 45.61% C, 5.52% H, and 4.90% S corresponding to mesyl substitution of 0.46 mesyl groups per anhydroglucose unit.

A commercially available polyamide resin (Aldrich) was used. The polyamide was formed by condensation of polyamine with dibasic carboxylic acids produced from unsaturated fatty acids. GPC analysis established the molecular weight of the polyamide as 18000. The dibasic acids have complicated structures with bulky hydrocarbon side chains. An aliquot of the resin was dissolved in THF and slowly precipitated in water. The pH was 8.1, assuring that the carboxylic acids occurred in their salt forms. Elemental analysis gave 77.80% C, 11.48% H, and 3.80% N.

Polyamide was grafted onto mesylated cellulose acetate in DMF:THF solvent by substitution nucleophilic biomolecular ($SN_2$) reaction. The grafting reaction was carried out by adding 0.50 g (product 1) or 1.00 (product 2) g of mesylated cellulose acetate and 1.00 g of polyamide carboxylate to a 25 mL Erlenmeyer flask with 20 mL of 2:1 dimethylformamide (DMF):tetrahydrofuran (THF) and reacting the mixture at 80° C. for 20 hours. Polyamide homopolymer was subjected to identical reaction conditions as a control. A mixture of unheated polyamide and mesylated cellulose acetate (1 g each) was also prepared and precipitated.

The copolymers were precipitated with 200 ml of 4:1 methanol:water, filtered, washed with water and methanol, and dried. Precipitation of the reaction mixture produced a cellulose acetate-type product that was easy to work with. The unreacted mixture of the polyamide and mesylated cellulose acetate produced a sticky precipitate upon addition of the methanol:$H_2O$. The polyamide homopolymer also behaved in a similar fashion. This observation indicated that there was very little polyamide homopolymer and that the grafting reaction product was not a physical mixture of the polyamide and mesylated cellulose acetate.

The product was extracted with toluene in a Soxhlet extractor to remove any unreacted polyamide homopolymer, dried, and weighed. Amounts of unreacted homopolymer present in the toluene extracts were determined after evaporation of the toluene. Grafting yields were calculated as the weight percent of the polyamide (PA) attached to the cellulose backbone according to the following formula:

$$\frac{(\text{Mass } PA \text{ used } - \text{ Mass } PA \text{ recovered in toluene})}{\text{Mass } PA \text{ used}} \times 100\%$$

The results of the grafting experiments are shown in Table 4, wherein the term AGU represents the number of anhydroglucose units per polyamide side chain based on the copolymer composition, a molecular weight of 18000 for polyamide, and an average molecular weight of 306 for a mesylated AGU unit.

Differential scanning calorimetry of the products as conducted using approximately 12 mg samples and a scanning rate of 10° C./min. Thermal mechanical analysis was carried out on powdered samples in a small aluminum pan using a 1 g load and a 3.5 mm diameter probe.

GPC analysis of product 1 before and after heating at 80° C. for 20 hours showed that grafting took place because there was a large shift to high molecular weight material. GPC of the homopolymer following heating was identical to GPC of the unheated polyamide homopolymer, demonstrating that the increase in molecular weight was not caused by condensation of polyamide. The increase in weight of the products obtained, compared to the original weight of the mesylated cellulose acetate following extraction, as well as the fact that the heated polyamide was soluble in toluene at 70° C. also showed that grafting occurred. Some tailing was caused by the small amount of polyamide which did not graft.

Elemental analysis of the graft copolymers was consistent with their constituents (Table 5). The decrease in the amount of sulfur in the graft copolymers (1.14% in product 1, 1.80% in product 2) reflected an expected loss of some mesyl groups from the graft copolymer. There was also an increase in the carbon and hydrogen content of the graft copolymer.

Thermal analysis of the graft copolymers demonstrated a small increase in the glass transition temperature of the polyamide phase compared to that of the heated polyamide homopolymer. Product 2 showed a difference in the glass transition temperature of about 3° C. This small increase was expected where, as here, grafting occurs but the phases are incompatible. A similar change in the glass transition temperature of the copolymers, as compared to that of the polyamide homopolymer, was observed by thermo-mechanical analysis. The thermal expansion coefficients of the graft copolymers were 0.00015° C. It was not possible to measure the coefficient of thermal expansion for polyamide above the glass transition temperature because it flowed under its own weight.

IR spectral studies corroborated the fact that the polyamide chain was covalently linked to the cellulose backbone of the graft copolymers. The pure polyamide IR spectrum revealed the following: (1) the N-H stretching vibrations at 3300 cm $^{-1}$; (2) the 3070 cm$^{-1}$ overtone of in-plane N-H bending characteristic of secondary amides; and (3) the amide I band at 1630$^{cm-1}$. The IR spectra of the graft copolymer products, following extraction with toluene to remove any unreacted polyamide, still retained the above described bands associated with polyamide. In addition, the characteristic C=O stretching vibration for acetate groups of the cellulose acetate were present as well as the 1200 and 1030 cm$^{-1}$ bands characteristic of complex C-O and 810 cm$^{-1}$ and 920 cm$^{-1}$ bands characteristic of the anhydroglucose units.

TABLE 4

| Product No. | Grafting Efficiency | PA Content (Wt. %) | AGU per PA Chain |
|---|---|---|---|
| 1 | 84% | 63.1 | 25.1 |
| 2 | 80% | 45.6 | 71.2 |

TABLE 5

| Compound | C | H | S | N |
|---|---|---|---|---|
| Mesylated Cellulose Acetate | 45.61 | 5.52 | 4.90 | — |
| Polyamide | 77.80 | 11.48 | — | 3.80 |
| Graft Copolymer 1 | 64.52 | 9.93 | 1.14 | 2.48 |
| Graft Copolymer 2 | 62.81 | 9.40 | 1.80 | 2.15 |

We claim:

1. Method for converting a polysaccharide to a biodegradable thermoplastic graft copolymer capable of forming homogeneous blends with synthetic thermoplastic polymers, said method comprising the steps of chemically treating said polysaccharide to form on said polysaccharide nucleophilically displaceable groups at a substitution level of about 0.1 to about 0.75 nucleophilic displaceable groups per anhydroglucose unit of said polysaccharide;

forming an anionic polymer of the formula

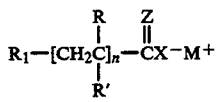

wherein R$_1$ is C$_1$-C$_6$ alkyl or a group of the formula

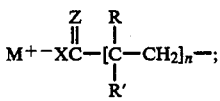

by (1) anionic polymerization of a compound of the formula R—CR=CH$_2$ and (2) treatment with a compound of the formula X=C=Z, wherein in the above formulas R and R' are independently hydrogen, C$_1$-C$_6$ alkyl, phenyl, substituted phenyl or methoxycarbonyl; X and Z are each independently O or S; M$^+$ is an alkali metal cation; and n is an integer such that the group

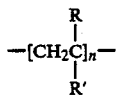

has a molecular weight between about 3000 and about 25,000;

reacting said anionic thermoplastic polymer with said polysaccharide-bearing nucleophilically displaceable groups under conditions conducive to nucleophilic displacement of said groups by said anionic polymer; and isolating the resulting biodegradable thermoplastic graft copolymer.

2. The method of claim 1 wherein the nucleophilic displaceable group is methanesulfonyloxy or arylsulfonyloxy.

3. The method of claim 1 wherein the polysaccharide is selected from the group consisting of starch, lignin, chitin and cellulose.

4. The method of claim 1 wherein the polysaccharide is a cellulose ether or cellulose ester.

5. The method of claim 1 wherein the polysaccharide is cellulose acetate.

6. The method of claim 1 wherein X and Z are O.

7. The method of claim 1 wherein X and Z are S.

8. The biodegradable thermoplastic graft copolymer prepared in accordance with the method of claim 1.

9. The biodegradable thermoplastic graft copolymer prepared in accordance with the method of claim 5.

10. The biodegradable thermoplastic graft copolymer prepared in accordance with the method of claim 6.

11. The biodegradable thermoplastic graft copolymer prepared in accordance with the method of claim 7.

12. A biodegradable thermoplastic polymer blend comprising a synthetic thermoplastic polymer and a biodegradable thermoplastic graft copolymer prepared in accordance with the method of claim 1.

13. A homogeneous biodegradable thermoplastic polymer blend comprising a synthetic thermoplastic polymer, a polysaccharide, and a biodegradable thermoplastic graft copolymer prepared in accordance with the method of claim 1.

14. An article of manufacture comprising the biodegradable thermoplastic graft copolymer of claim 8.

15. An article of manufacture comprising the biodegradable thermoplastic raft copolymer of claim 9.

16. An article of manufacture comprising the biodegradable thermoplastic graft copolymer of claim 10.

17. An article of manufacture comprising the biodegradable thermoplastic graft copolymer of claim 10.

18. An article of manufacture comprising the biodegradable polymer blend of claim 13.

19. Method for converting a polysaccharide to a biodegradable thermoplastic graft copolymer capable of forming homogeneous blends with synthetic thermoplastic polymers, said method comprising the steps of:

chemically treating said polysaccharide to form on said polysaccharide nucleophilically displaceable groups at a substitution level of about 0.1 to about 0.75 nucleophilically displaceable groups per anhydroglucose unit of said polysaccharide, said nucleophilic displaceable groups selected from the group consisting of halo, sulfonate, sulfate haloacetoxy, loweralkanesulfonyloxy benzylsulfonytoxy and arylsulfonyloxy;

reacting said polysaccharide bearing nucleophilic displaceable groups with an anionic thermoplastic polymer carboxylate or thiocarboxylate under conditions conducive to nucleophilic displacement of said groups by said anionic carboxylate or thiocarboxylate; and isolating the resulting biodegradable thermoplastic graft copolymer characterized by uniformity of degree of polymerization of the grafted anionic polymer groups and a degree of substitution on the polysaccharide chain such that there is at least one anionic polymer group for every 15 to 50 anhydroglucose units in the polysaccharide.

20. The method of claim 19 wherein the anionic thermoplastic polymer is a polyamide carboxylate.

21. The method of claim 19 wherein the anionic thermoplastic polymer is polystyryl carboxylate.

22. The method of claim 19 wherein the anionic thermoplastic polymer is hydrolyzed poly(methyl methacrylate).

* * * * *